(12) United States Patent
Kanai

(10) Patent No.: US 6,648,087 B2
(45) Date of Patent: Nov. 18, 2003

(54) RESERVOIR TANK FOR RADIATOR OF WATER-COOLED SADDLE-TYPE VEHICLE

(75) Inventor: Katsumi Kanai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,667

(22) Filed: Mar. 30, 2001

(65) Prior Publication Data

US 2001/0025733 A1 Oct. 4, 2001

(30) Foreign Application Priority Data

Mar. 30, 2000 (JP) ........................................ 2000-093782

(51) Int. Cl.[7] .............................................. B60K 11/04
(52) U.S. Cl. ...................................... 180/68.4; 180/68.6
(58) Field of Search ............................. 180/68.4, 68.1, 180/68.6, 68.2, 296, 306, 68.3, 69.24, 84; 280/291, 288.1, 288.2, 288.4

(56) References Cited

U.S. PATENT DOCUMENTS

| 3,650,344 A | * | 3/1972 | Plessinger et al. | .......... 280/291 |
| 4,570,740 A | * | 2/1986 | Hara | .......................... 180/68.4 |
| 4,667,758 A | * | 5/1987 | Tamura | ...................... 180/68.4 |
| 4,687,069 A | * | 8/1987 | Inomata et al. | ............ 180/68.2 |
| 4,744,433 A | * | 5/1988 | Takeuchi et al. | ........... 180/68.4 |
| 4,770,262 A | * | 9/1988 | Yasunaga et al. | .......... 180/68.1 |
| 6,058,719 A | * | 5/2000 | Cochran | ...................... 62/129 |

FOREIGN PATENT DOCUMENTS

| JP | Hei530556 | | 5/1987 | |
| JP | 11-11170 | * | 1/1999 | ................ 280/68.4 |
| JP | 2001-10580 | * | 1/2001 | ................ 280/68.4 |

* cited by examiner

Primary Examiner—Brian L. Johnson
Assistant Examiner—Hau Phan
(74) Attorney, Agent, or Firm—Birch, Stewart, Kolasch & Birch, LLP

(57) ABSTRACT

To provide a reservoir tank for a radiator of a water-cooled saddle-type vehicle which ensures an improved degree of freedom in setting the shape and mounting position of the reservoir tank. A reservoir tank for a radiator of a saddle-type vehicle includes a water reservoir section located beneath the rear part of a seat rail, for reserving the cooling water, and a water supply section extending upwardly from the water reservoir section. The reservoir tank includes a major portion of the water reservoir section located further toward an inside the vehicle than on the seat rail, and the water supply section extends upwardly from the side of the water reservoir section toward the outside of the seat rail.

20 Claims, 4 Drawing Sheets

RESERVOIR TANK FOR RADIATOR OF WATER-COOLED SADDLE-TYPE VEHICLE

BACKGROUND OF THE INVENTION

1. Field of the Invention

The present invention relates to a reservoir tank from which cooling water is supplied to a radiator mounted on a water-cooled saddle-type vehicle.

2. Description of Background Art

A reservoir tank for the radiator of a water-cooled saddle-type vehicle has been proposed as an example in Japanese Examined Utility Model Publication No. H5-30556.

In a water-cooled saddle-type vehicle applied with this technology, a major section of the vehicle body of the vehicle includes a main frame mounted with a radiator at the front, a seat rail extending to the rear of the main frame, an underframe arranged beneath the main frame, and a seat rail stay extending obliquely downwardly from the seat rail for connecting the seal rail to the underframe.

A pair of front wheels (one front wheel in the case of a three-wheeled vehicle) are mounted on both sides of the front part of the main frame and the underframe. Furthermore, a pair of rear wheels are mounted on both sides of the seat rail beneath the rear part of the underframe.

The reservoir tank for holding the cooling water to be supplied to the radiator is mounted in the vicinity of the connection between the seat rail stay and the seat rail, in such a manner that the reservoir tank extends to the outside of the seat rail stay. The reservoir tank is connected by a breather tube to the radiator mounted at the front part of the vehicle body.

The background art reservoir tank still has the following problem to be solved. Specifically, the reservoir tank is located outside of the seat rail stay; however, in this position the rear wheels are oppositely arranged on the seat rail stay. Furthermore, another vehicle structure, such as a suspension mechanism for mounting the rear wheels to the vehicle body, are mounted between the seat rail stay and the rear wheels. Therefore, there is the problem since the shape and mounting position of the reservoir tank will be limited due to a narrow mounting space for the reservoir tank.

SUMMARY OF THE INVENTION

In view of the above-described problem inherent in the heretofore known reservoir tank, it is an object of the invention to provide a reservoir tank for a radiator for water-cooled saddle-type vehicle that has an enhanced degree of freedom in the design of its configuration and mounting position.

A reservoir tank for a radiator of a water-cooled saddle-type vehicle according to a first aspect of the present invention is a reservoir tank connected to a radiator for a water-cooled saddle-type vehicle for the purpose of achieving the aforesaid object. The reservoir tank includes a water reservoir section for holding the cooling water and a water supply section extending above the water supply section and mounted beneath the rear part of a seat rail forming the saddle-type vehicle. The major portion of the water reservoir section is located further toward the inside of the vehicle than on the seat rail and the water supply section extends upwardly from the side of the water reservoir section to the outside of the seat rail.

A reservoir tank for a radiator of a water-cooled saddle-type vehicle according to a second aspect of the present invention includes a rear fender covering the seat rail that is attached at the rear part of the seat rail of the first aspect of the present invention. The water supply section protrudes through the rear fender out to the upper surface of the rear fender.

A reservoir tank for a radiator of a water-cooled saddle-type vehicle according to a third aspect of the present invention includes a pair of water level lines, upper and lower, on the side surface of the reservoir tank according to the first or second aspects of the present invention. The reservoir tank is mounted so that the water level lines are located above the top end portion of the rear wheel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

One preferred embodiment of a reservoir tank according to the present invention will be described with reference to the accompanying drawings.

Figure 1:
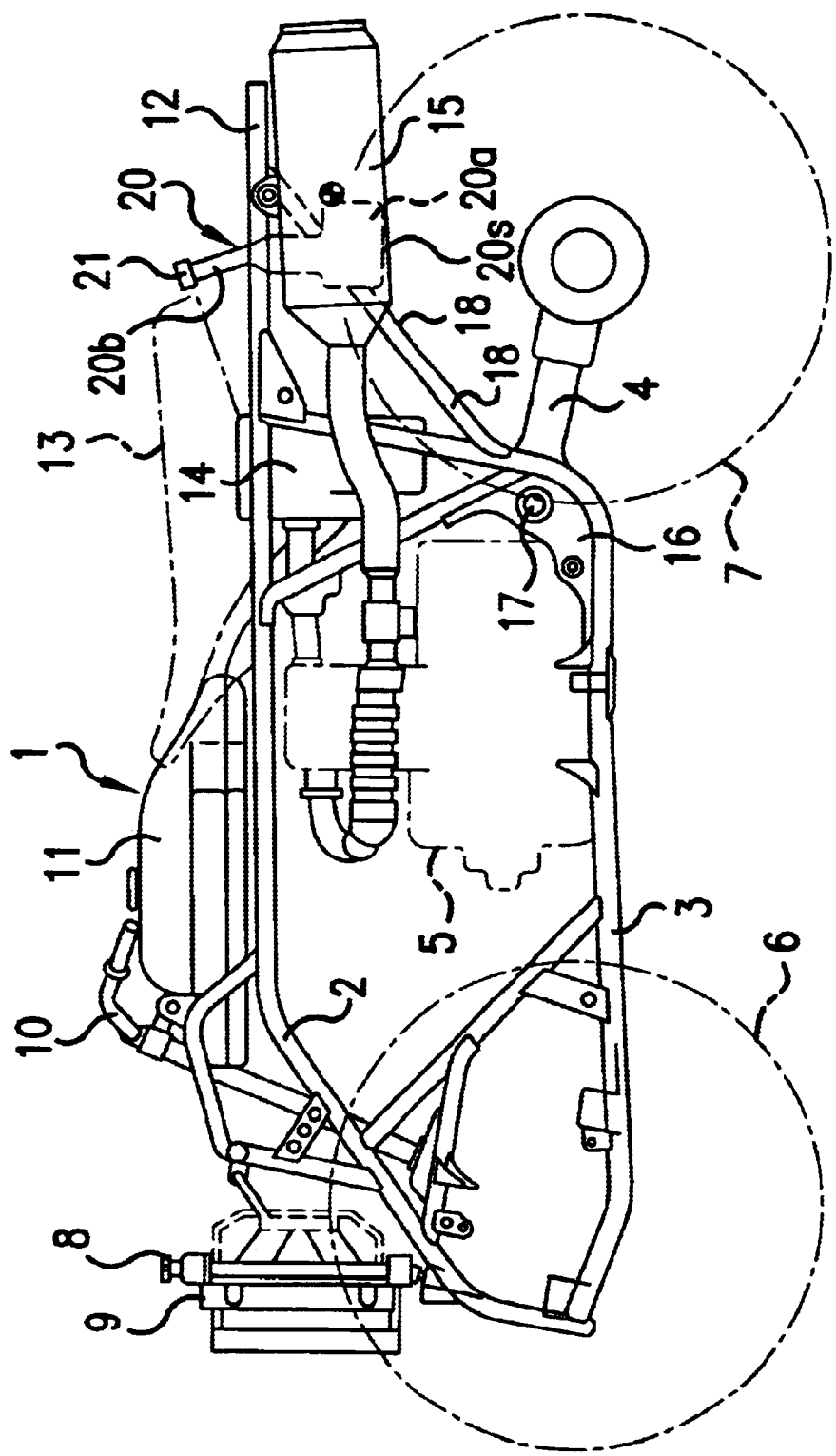
FIG. 1 is a schematic side view showing an example of one embodiment of a water-cooled saddle-type vehicle according to the present invention.

In FIG. 1, reference numeral 1 denotes a water-cooled saddle-type vehicle (hereinafter called the vehicle for short) applied with the present embodiment. The vehicle 1 includes a pair of main frames 2, right and left, forming the upper part of the vehicle body, a pair of underframes 3, right and left, arranged along the lower part of the main frames 2 and connected to the main frames 2 at the front, a rear fork 4 vertically swingably installed at the rear of the underframes 3, and an engine 5 mounted in a space formed between the main frames 2 and the underframes 3 and secured to the underframes 3. Furthermore, the vehicle 1 includes a pair of front wheels 6, right and left, vertically movably mounted on the right and left sides of the front part of the main frames 2 and the underframes 3, and a pair of rear wheels 7 mounted on the right and left sides of the rear forks 4.

Forward of the main frames 2 a radiator 8 for cooling the cooling water being recirculated to the engine 5, and an oil cooler 9 for cooling the oil being recirculated similarly to the engine are mounted. At the front of the main frames 2, and behind the radiator 8 and the oil cooler 9, a steering handlebar 10 is located for steering the front wheels 6. A fuel tank 11 is mounted behind the steering handlebar 10.

Furthermore, behind the fuel tank 11 a seat 13 is supported by the seat rail 12 extending from the rear of the main frames 2. Beneath the seat 13 is mounted an air cleaner 14 for cleaning the air for combustion to be supplied to the engine 5.

A muffler 15 is connected to the engine 5 for discharging combustion gases out and deadening exhaust sound. The muffler 15 is disposed between the seat rail 12 and the rear wheels 7, and is supported on the seat rail 12.

In addition, the rear fork 4 is swingably supported on a bearing 17 that is mounted on a pivot plate 16 at the rear part of the underframes 3.

Figure 2:
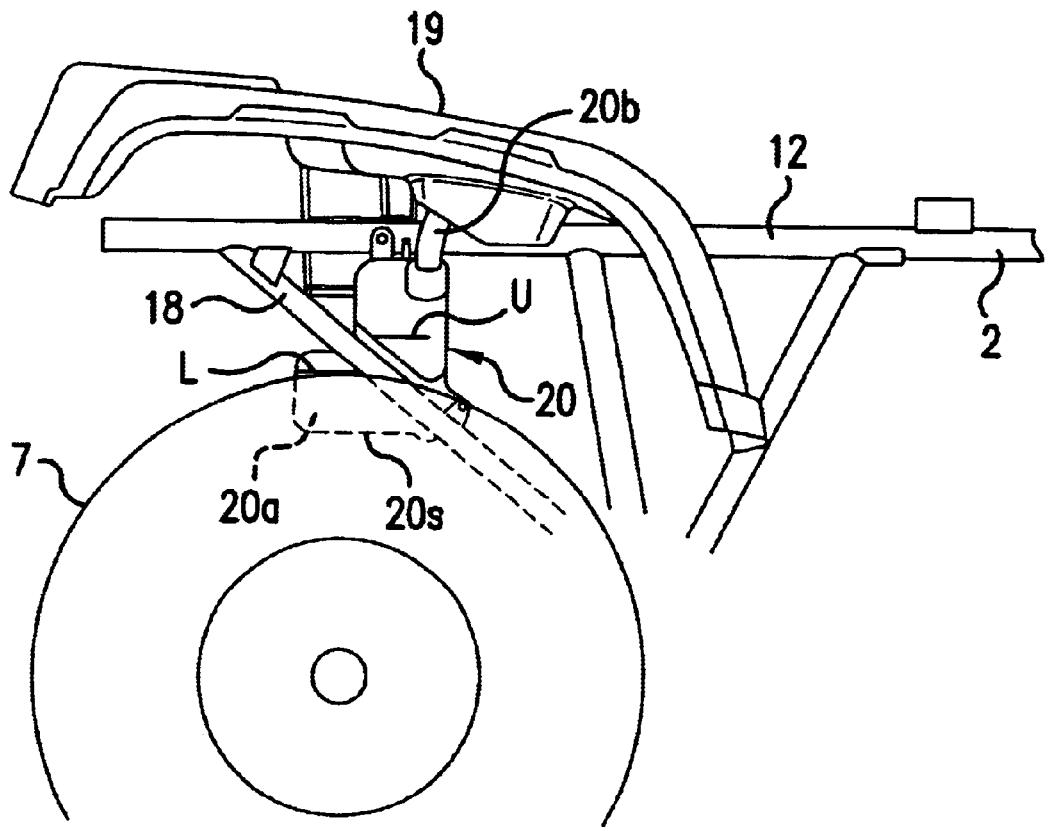
FIG. 2 is an enlarged right side view of one embodiment of the present invention, showing the rear part of the vehicle.
Figure 3:
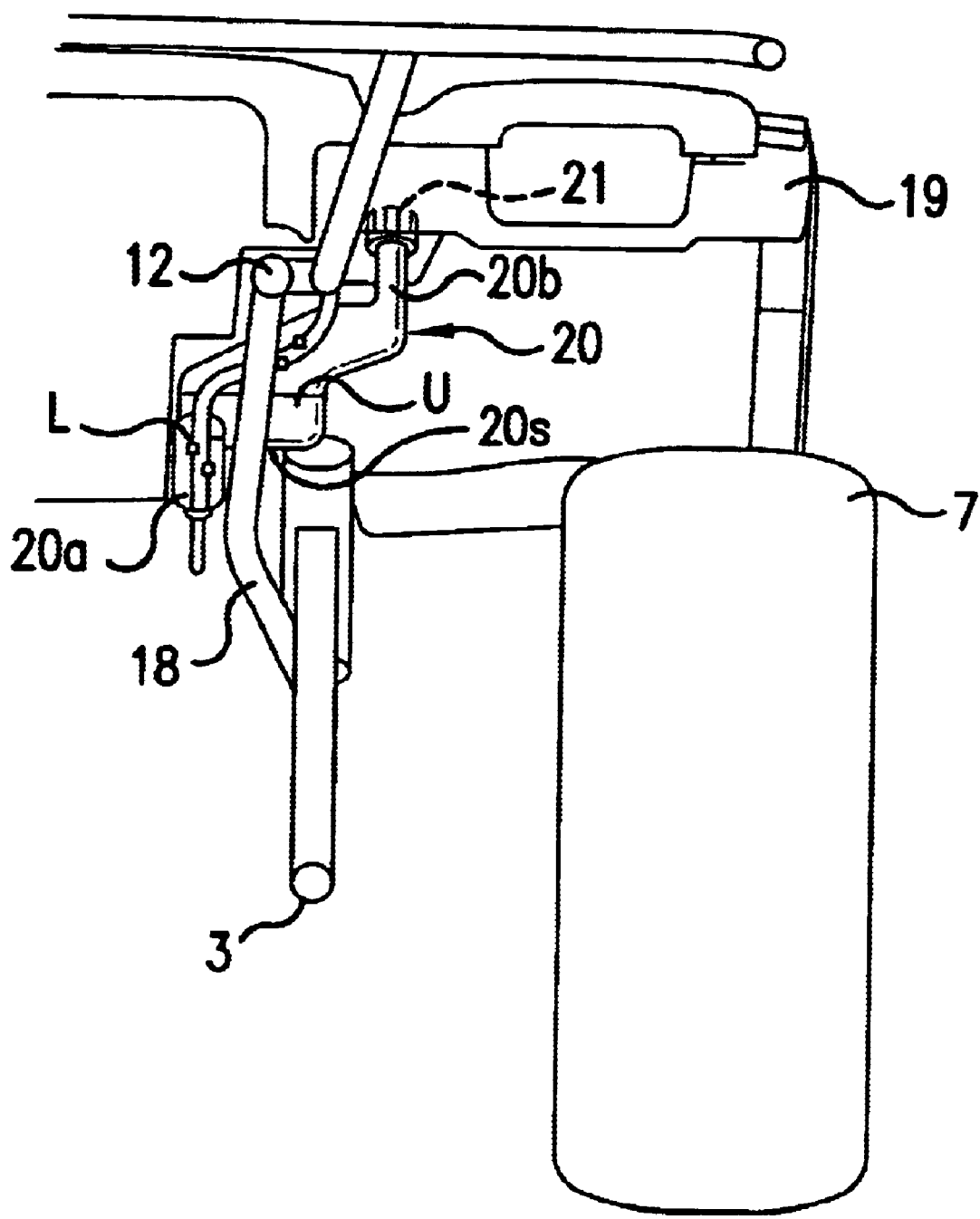
FIG. 3 is an enlarged view of one embodiment of the present invention, showing the right side of the vehicle as viewed from the rear of the vehicle.

Underneath the seat rail 12, a seat rail stay 18 for connecting the seat rail 12 to the rear of the underframes 3 is attached obliquely downwardly and forwardly from the seat rail 12. Furthermore, as shown in FIGS. 2 and 3, a rear fender 19 covering the seat rail 12 and the rear wheels 7 is attached above the seat rail 12. Near the top end portion of the seat rail stay 18 is installed a reservoir tank 20 of the present embodiment.

The reservoir tank 20, as shown in FIGS. 2 and 3, includes a water reservoir section 20*a* for holding the cooling water, and a water supply section 20*b* extending over the water reservoir section 20*a*. A major portion of the water reservoir section 20*a* is disposed further inside of the vehicle than on the seat rail stay 18 side. The water supply section 20*b* extends upwardly from the side of the water reservoir section 20*a* to the outside of the seat rail 12.

In order to describe the above construction in more detail, the lower part of the water reservoir section 20*a* is formed longer in the longitudinal direction of the vehicle, than the upper part that is formed narrow in the longitudinal direction of the vehicle. The upper part extends to the outside of the vehicle across the rear rail stay 18.

The water supply section 20*b* is formed approximately cylindrical. On the outside of the seat rail 12, the water supply section 20*b* extends upwardly of the vehicle from the upper part of the water reservoir section 20*a*. On the top end portion a cap 21 is removably attached by screws.

Figure 4:
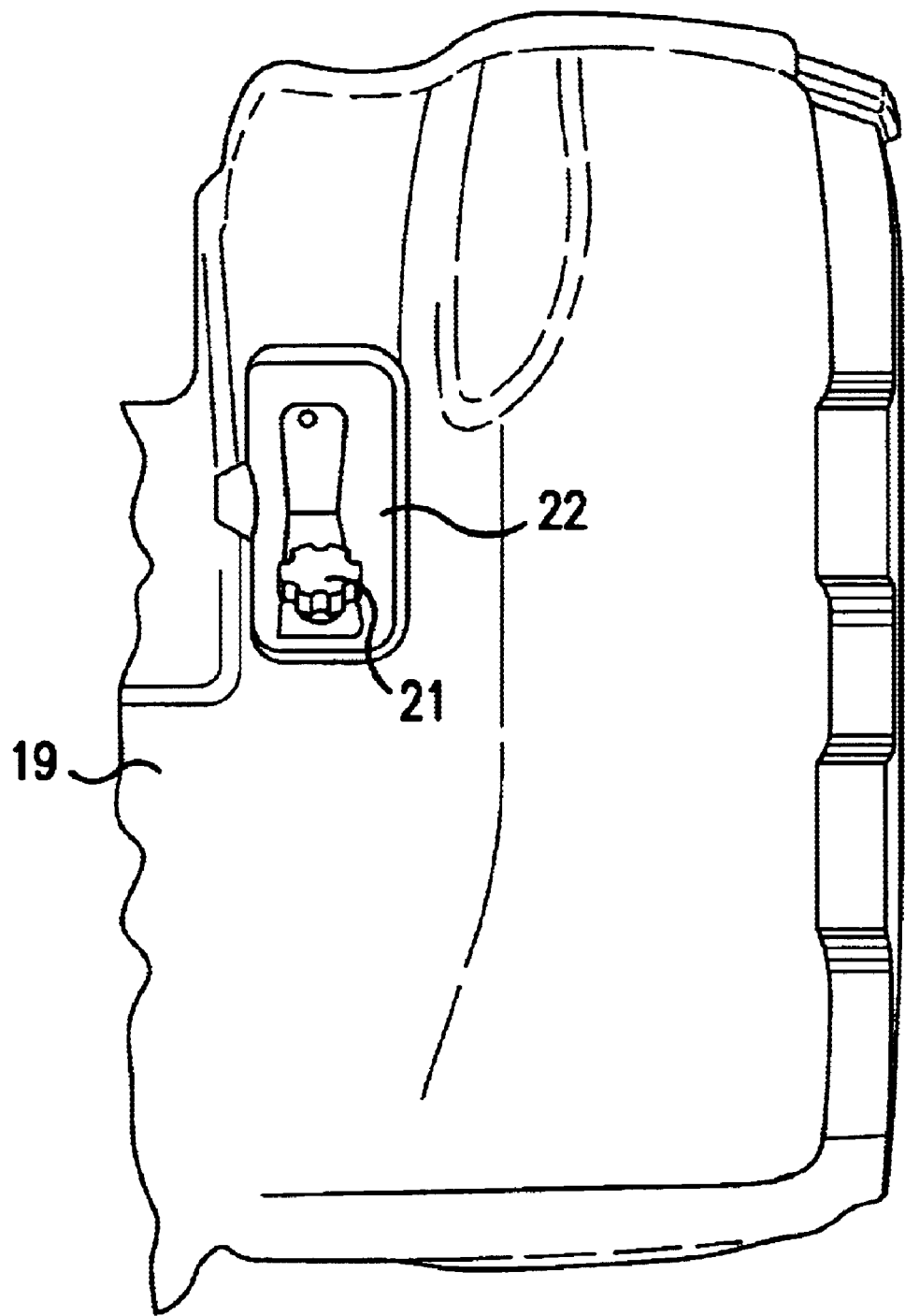
FIG. 4 is an enlarged plan view of one embodiment of the present invention, showing the right side of the rear of the vehicle.

The top end portion of the water supply section 20*b* protrudes upwardly through the rear fender 19 as shown in FIGS. 3 and 4. The cap 21 installed on the top end portion is removable from on top of the rear fender 19.

On the side surface of the water reservoir section 20*a* of the reservoir tank 20 are provided, as shown in FIGS. 2 and 3, a pair of water level lines U and L, by which, the amount of cooling water held in the water reservoir section 20*a* can be confirmed.

In the present embodiment, the reservoir tank 20 is mounted so that the position of the water level lines U and L will be above the top end portion of the rear wheels 7 mounted at the rear of the vehicle as shown in FIG. 2. It is, therefore, possible to check the quantity of the cooling water in the reservoir tank 20 from the side of the vehicle.

The driver usually checks, the quantity of the cooling water in the off-the-vehicle state. Therefore, the mounting position of the reservoir tank 20 should be determined according to the position of the vehicle frame and the rear wheels 7 when the driver is off the vehicle.

Furthermore, a recess 22 is formed in the rear fender 19 where the water supply section 20*b* is mounted through, surrounding the cap 21 installed in the water supply section 20*b* as shown in detail in FIGS. 2 to 4.

In the reservoir tank 20 of the present embodiment of the above construction, the lower part of the water reservoir section 20*a*, being disposed inside of the seat rail 12, is positioned inside of the seat rail 12, thereby easily ensuring the provision of a required capacity of the reservoir tank 20.

Since the upper part of the water reservoir section 20*a* is positioned above the seat rail 12 and the water supply section 20*b* extends upwardly of the vehicle from the upper side portion of the water reservoir section 20*a*, the reservoir tank 20 is restricted to a small size at the protruding portion in the space between the seat rail 12 and the rear wheels 7. This prevents interference with other component members of the vehicle disposed between the seat rail 12 and the rear wheels 7.

As a result, an enhanced degree of freedom in determining the mounting position of the reservoir tank 20 is obtained when setting the reservoir tank 20.

Therefore, as previously stated, it becomes possible to determine the mounting position of the reservoir tank 20 in which the water level lines U and L will be located above the top end portion of the rear wheels 7, thereby allowing an easy check of the quantity of the cooling water.

Furthermore, the water supply section 20*b* of the reservoir tank 20 extends upwardly, and the cap 21 installed on the forward end thereof protrudes upwardly of the rear fender 19, thus enabling easy supply of the cooling water to the reservoir tank 20.

Although shapes and dimensions of the component members according to the invention have been shown and described as an example, it should be understood that various changes and modifications may be made according to design requirements.

For example, in the embodiment described above, the four-wheeled saddle-type vehicle has been described as an example of a vehicle on which the embodiment of the present invention can be supported; however, the invention is applicable also to other types of vehicles such as a three-wheeled saddle-type vehicles and motorcycles.

According to the reservoir tank for the radiator of a water-cooled saddle-type vehicle pertaining to the present invention, as described above, the major portion of the water reservoir section is disposed inside of the seat rail that can provide a relatively wide space. Therefore, a required capacity of the reservoir tank can easily be provided.

Furthermore, since the water supply section extends upwardly of the vehicle from the upper side portion of the water reservoir section, it is possible to decrease the portion of the reservoir tank protruding out in the space between the seat rail and the rear wheel, thereby enabling the prevention of interference between other vehicle component members of the vehicle disposed between the seat rail and the rear wheels and the reservoir tank. Consequently, the degree of freedom in determining the mounting position can be improved when the reservoir tank is mounted.

Therefore, it becomes possible to determine the reservoir tank mounting position so that the water level lines formed on the reservoir tank will extend above the top end portion of the rear wheels. Accordingly, easy and reliable checking of the quantity of the cooling water in the reservoir tank can be ensured.

Furthermore, the water supply section of the reservoir tank extends upwardly, and the forward end portion of the water supply section protrudes upwardly of the rear fender, thus enabling easy supply of the cooling water to the reservoir tank.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A reservoir tank for a radiator of a water-cooled saddle-type vehicle having a rear fender, comprising:
    a water reservoir section locatable beneath a rear part of a seat rail of the saddle-type vehicle, said water reservoir section for reserving cooling water; and
    a water supply section extending above said water reservoir section, said water supply section being protrudable through the rear fender to an upper surface of the rear fender,
    wherein a capacity of a portion of said water reservoir section on an inside side of the seat rail of the vehicle is larger than a capacity of a portion of said water reservoir section located on an outside side of the seat rail of the vehicle, and said water supply section extends upward from an outside side of said water reservoir section outwardly of the vehicle.

2. The reservoir tank for a radiator of a water-cooled saddle-type vehicle according to claim 1, said rear fender being installed at a rear part of the seat rail to cover the seat rail, and said water supply section being protrudable through a recess in the rear fender to an upper surface of the rear fender.

3. The reservoir tank for a radiator of a water-cooled saddle-type vehicle according to claim 2, wherein said reservoir tank has on a side surface thereof upper and lower water level lines, said upper and lower water level lines being positionable above a top end portion of a rear wheel mounted at a rear of the vehicle.

4. The reservoir tank for a radiator of a water-cooled saddle-type vehicle according to claim 3, wherein a lower part of said water reservoir section is formed longer in a longitudinal direction of the vehicle than an upper part of said water reservoir section, said upper part of said water reservoir section extending from the inside side of the seat rail of the vehicle, across a rear rail stay of the vehicle to an outside side of the seat rail of the vehicle.

5. The reservoir tank for a radiator of a water-cooled saddle-type vehicle according to claim 2, wherein a lower part of said water reservoir section is formed longer in a longitudinal direction of the vehicle than an upper part of said water reservoir section, said upper part of said water reservoir section extending from the inside side of the seat rail of the vehicle, across a rear rail stay of the vehicle to an outside side of the seat rail of the vehicle.

6. The reservoir tank for a radiator of a water-cooled saddle-type vehicle according to claim 1, wherein said reservoir tank has on a side surface thereof upper and lower water level lines, said upper and lower water level lines being positionable above a top end portion of a rear wheel mounted at a rear of the vehicle.

7. The reservoir tank for a radiator of a water-cooled saddle-type vehicle according to claim 6, wherein a lower part of said water reservoir section is formed longer in a longitudinal direction of the vehicle than an upper part of said water reservoir section, said upper part of said water reservoir section extending from the inside side of the seat rail of the vehicle, across a rear rail stay of the vehicle to an outside side of the seat rail of the vehicle.

8. The reservoir tank for a radiator of a water-cooled saddle-type vehicle according to claim 1, wherein a lower part of said water reservoir section is formed longer in a longitudinal direction of the vehicle than an upper part of said water reservoir section, said upper part of said water reservoir section extending from the inside side of the seat rail of the vehicle, across a rear rail stay of the vehicle to an outside side of the seat rail of the vehicle.

9. The reservoir tank for a radiator of a water-cooled saddle-type vehicle according to claim 1, wherein said water supply section is formed approximately cylindrical.

10. A water-cooled saddle-type vehicle, comprising:
    a vehicle frame;
    a seat rail extending from a rear portion of said vehicle frame;
    a radiator; and
    a reservoir tank, said reservoir tank being connected to said radiator and including:
        a water reservoir section located beneath a rear part of said seat rail, said water reservoir section for reserving cooling water; and
        a water supply section extending above said water reservoir section, said water supply section being protrudable through a rear fender of the vehicle to an upper surface of the rear fender,
    wherein a capacity of a portion of said water reservoir section on an inside side of said seat rail is larger than a capacity of a portion of said water reservoir section located on an outside side of said seat rail and said water supply section extends upward from an outside side of said water reservoir section outwardly of the vehicle.

11. The water-cooled saddle-type vehicle according to claim 10, said rear fender being installed at a rear part of the seat rail to cover the seat rail, and said water supply section being protrudable through a recess in the rear fender to an upper surface of the rear fender.

12. The water-cooled saddle-type vehicle according to claim 11, wherein said reservoir tank has on a side surface thereof upper and lower water level lines, said upper and lower water level lines being positioned above a top end portion of a rear wheel mounted at a rear of the vehicle.

13. The water-cooled saddle-type vehicle according to claim 12, wherein a lower part of said water reservoir section is formed longer in a longitudinal direction of the vehicle than an upper part of said water reservoir section, said upper part of said water reservoir section extending from the inside side of said seat rail, across a rear rail stay of the vehicle to an outside side of said seat rail.

14. The water-cooled saddle-type vehicle according to claim 11, wherein a lower part of said water reservoir section is formed longer in a longitudinal direction of the vehicle than an upper part of said water reservoir section, said upper part of said water reservoir section extending from the inside side of said seat rail, across a rear rail stay of the vehicle to an outside side of said seat rail.

15. The water-cooled saddle-type vehicle according to claim 10, wherein said reservoir tank has on a side surface thereof upper and lower water level lines, said upper and lower water level lines being positioned above a top end portion of a rear wheel mounted at a rear of the vehicle.

16. The water-cooled saddle-type vehicle according to claim 15, wherein a lower part of said water reservoir section is formed longer in a longitudinal direction of the vehicle than an upper part of said water reservoir section, said upper part of said water reservoir section extending from the inside side of said seat rail, across a rear rail stay of the vehicle to an outside side of said seat rail.

17. The water-cooled saddle-type vehicle according to claim 10, wherein a lower part of said water reservoir section is formed longer in a longitudinal direction of the vehicle than an upper part of said water reservoir section, said upper part of said water reservoir section extending from the inside side of said seat rail, across a rear rail stay of the vehicle to an outside side of said seat rail.

18. The water-cooled saddle-type vehicle according to claim 10, wherein said water supply section is formed approximately cylindrical.

19. The water-cooled saddle-type vehicle according to claim 10, wherein said vehicle has two or more wheels.

20. A water-cooled saddle-type vehicle, comprising:
   a vehicle frame;
   a seat rail and a seat rail stay extending from a rear portion of said vehicle frame;
   a radiator; and
   a reservoir tank, said reservoir tank being connected to said radiator and including:
      a water reservoir section located beneath a rear part of said seat rail, said water reservoir section for reserving cooling water; and
      a water supply section extending above said water reservoir section to a position outside of said seat rail stay,
   wherein a lowest most portion of the water reservoir section is disposed entirely inside said seat rail stay,
   wherein a capacity of a portion of said water reservoir section on an inside side of said seat rail stay is larger than a capacity of a portion of said water reservoir section located on an outside side of said seat rail stay.

* * * * *